US011180974B2

United States Patent
Vick, Jr. et al.

(10) Patent No.: US 11,180,974 B2
(45) Date of Patent: Nov. 23, 2021

(54) INSERT SAFELY VALVE

(71) Applicant: Halliburton Energy Services, Inc., Houston, TX (US)

(72) Inventors: James Dan Vick, Jr., Dallas, TX (US); Jimmie Robert Williamson, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 154 days.

(21) Appl. No.: 16/500,345

(22) PCT Filed: Dec. 28, 2018

(86) PCT No.: PCT/US2018/067800
§ 371 (c)(1),
(2) Date: Oct. 2, 2019

(87) PCT Pub. No.: WO2020/139361
PCT Pub. Date: Jul. 2, 2020

(65) Prior Publication Data
US 2021/0108487 A1 Apr. 15, 2021

(51) Int. Cl.
*E21B 34/12* (2006.01)
*E21B 23/04* (2006.01)
*E21B 34/06* (2006.01)
(Continued)

(52) U.S. Cl.
CPC .............. *E21B 34/12* (2013.01); *E21B 23/04* (2013.01); *E21B 34/066* (2013.01); *E21B 34/10* (2013.01); *E21B 34/16* (2013.01); *E21B 2200/05* (2020.05)

(58) Field of Classification Search
CPC ........ E21B 34/12; E21B 34/066; E21B 34/16; E21B 34/10; E21B 2200/05; E21B 34/14;
(Continued)

(56) References Cited

U.S. PATENT DOCUMENTS 4,119,146 A   10/1978 Taylor
4,834,183 A    5/1989 Vinzant et al.
(Continued)

FOREIGN PATENT DOCUMENTS

WO    2014065813 A1    5/2014
WO    2015094520 A1    6/2015

OTHER PUBLICATIONS

PCT Application Serial No. PCT/US2018/067800, International Search Report, dated Sep. 26, 2019, 3 pages.
(Continued)

*Primary Examiner* — Michael R Wills, III
(74) *Attorney, Agent, or Firm* — Gilliam IP LLC

(57) ABSTRACT

An apparatus includes a cylindrical housing having a hinge, a flapper attached to the hinge, and a slidable element is within the cylindrical housing, wherein the flapper can rotate from a first flapper position to a second flapper position. The slidable element is slidable from a first position to a second position and engages with the flapper at the first position to prevent the flapper from moving to the second flapper position. The flapper is movable to the second flapper position when the slidable element is disengaged from the flapper. The apparatus also includes a latching mechanism attached to the slidable element movable from a first latching mechanism position to a second latching mechanism position. The slidable element is at the first position when the latching mechanism is at the first latching mechanism position and at the second position when the latching mechanism is at the second latching mechanism position.

20 Claims, 9 Drawing Sheets

(51) Int. Cl.
*E21B 34/10* (2006.01)
*E21B 34/16* (2006.01)

(58) Field of Classification Search
CPC .... E21B 34/105; E21B 34/106; E21B 34/107; E21B 23/04; E21B 34/06; F16K 15/03; F16K 1/2007
See application file for complete search history.

(56) References Cited

U.S. PATENT DOCUMENTS

| | | |
|---|---|---|
| 5,226,483 A | 7/1993 | Williamson, Jr. |
| 5,249,630 A | 10/1993 | Meaders et al. |
| 6,352,118 B1 | 3/2002 | Dickson et al. |
| 6,988,556 B2 | 1/2006 | Vick, Jr. |
| 7,694,740 B2 | 4/2010 | Mailand et al. |
| 7,891,428 B2 | 2/2011 | Martin et al. |
| 7,967,074 B2 | 6/2011 | Lake et al. |
| 8,056,637 B2 | 11/2011 | Larnach |
| 2008/0210431 A1 | 9/2008 | Johnson et al. |
| 2011/0155381 A1 | 6/2011 | Reaux |
| 2013/0032355 A1* | 2/2013 | Scott .................... E21B 34/066 166/373 |
| 2014/0238698 A1 | 8/2014 | Jones et al. |

OTHER PUBLICATIONS

PCT Application Serial No. PCT/US2018/067800, International Written Opinion, dated Sep. 26, 2019, 8 pages.
Garner, et al., "At the Ready: Subsurface Safety Valves", Oilfield Review, pp. 52-64.

* cited by examiner

INSERT SAFELY VALVE

BACKGROUND

The disclosure generally relates to the field of mechanical equipment and operations, and more particularly to a safety valve.

Subsurface safety valves may operate as a failsafe device to prevent the uncontrolled release of reservoir fluids. Some safety valves are flapper-type valves that are opened and closed by way of a flow tube moving linearly within a production tubular. The flow tube is often controlled hydraulically from the surface and is forced into its open position using a piston and rod assembly that may be hydraulically charged via a control line linked to a hydraulic system at the well surface. When sufficient hydraulic pressure is conveyed to the subsurface safety valve via the control line, the piston and rod assembly forces the flow tube downwards, to compress a spring and push the flapper downwards to the open position. When the hydraulic pressure is removed from the control line, the spring pushes the flow tube back up, which allows the flapper to move into its closed position. In some cases, corrosion and physical damage can degrade the mechanism's functional integrity, perhaps damaging the seal surface between the flapper on the safety valve flapper. A flapper in this condition may no longer stop fluid flow through the safety valve, so that the safety valve is less effective as a failsafe device.

BRIEF DESCRIPTION OF THE DRAWINGS

Embodiments of the disclosure may be better understood by referencing the accompanying drawings.

DESCRIPTION OF EMBODIMENTS

Figure 1:
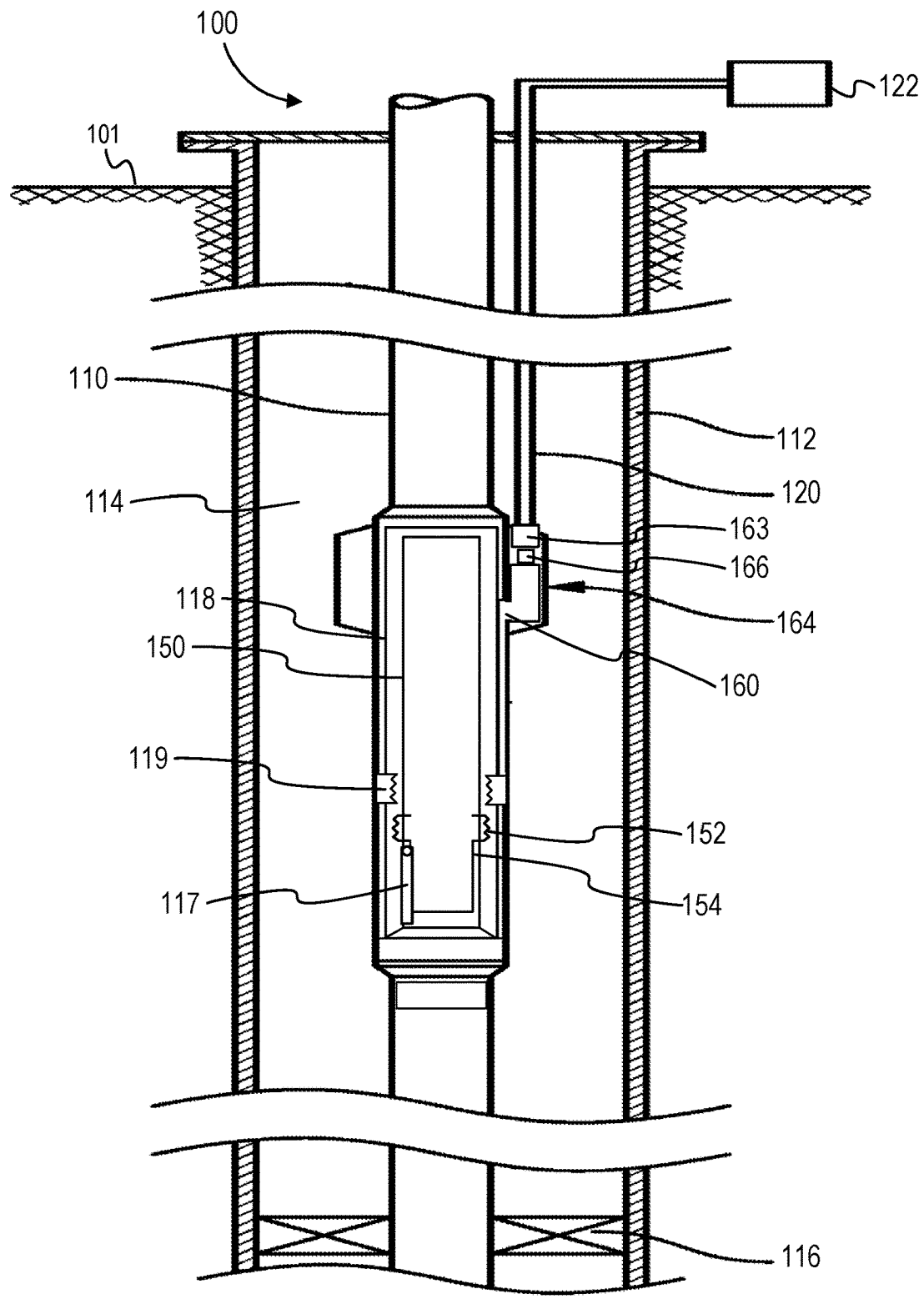
FIG. 1 is a schematic diagram of a well system having an outer safety valve (OSV) and an insertable safety valve (ISV).

The description that follows includes example systems, methods, techniques, and operations that embody aspects of the disclosure. However, it is understood that this disclosure may be practiced without these specific details. For instance, this disclosure refers to a safety valve having a single latching mechanism. Aspects of this disclosure can also be applied to safety valves having a plurality of the latching mechanisms. Similarly, this disclosure refers to a safety valve having a single latching profile. Aspects of this disclosure can also be applied to safety valves having a plurality of the latching profiles. In other instances, well-known structures and techniques have not been shown in detail in order not to obfuscate the description.

Various embodiments include a set of tools or components that can be combined into an assembly that includes an insertable safety valve (ISV) at least partially disposed inside of an outer safety valve (OSV). During an operation to stop fluid flow through a well, an OSV having a control system can be used to stop the fluid flow. The control system can include at least one of a control line connector in the OSV to connect to a pressurized control line, a signal receiver that can receive at least one of an electrical signals or optical signals from a control line, and a wireless control system including a digital signal receiver for electromagnetic signals or acoustic signals. The ISV can include an ISV latching mechanism to latch onto an OSV latching profile of the OSV, wherein a profile is a set of grooves on a surface and a latching mechanism comprises at least one protrusion, and wherein a latching mechanism and a latching profile are latched when at least one protrusion on a first profile is inside a groove on a second protrusion of the other profile. In some embodiments, the ISV latching mechanism can be a collet such as a double-ended collet comprising an elastic material such as a metal or a polymer.

As further described below for FIG. 8, cycling the OSV can align the ISV latching mechanism with the OSV latching profile such that the ISV latching mechanism can latch into the OSV latching profile (sometimes called an OSV exercise profile). In some embodiments, the ISV latching mechanism can be made of or otherwise comprise an elastic material such as a metal and/or a polymer that pushes the protrusions of the ISV latching mechanism into the grooves of the OSV latching profile during a latching process. In some embodiments, an elastic element such as a spring below the ISV latching mechanism can reinforce the latching action and further prop the ISV latching mechanism against radially compressive forces. Alternatively, or in addition, the ISV can include one or more spring-loaded noses attached to the slidable element to secure the ISV to the OSV. Furthermore, some embodiments can include a latching locking set comprising an ISV latching mechanism that is complementary to an OSV latching profile, wherein at least one of the ISV latching mechanism and/or OSV latching profile can include a radially compressible element. The radially compressible element of the ISV/OSV set can be compressed into its corresponding receiving surface on the OSV/ISV, respectively, until the ISV latching mechanism and OSV latching profile are latched and anchored in place. In some embodiments, if the ISV latching mechanism is latched to the OSV latching profile, the ISV latching mechanism is at a first ISV latching mechanism position when the OSV latching profile is at a first OSV latching profile position, and the ISV latching mechanism is at a second ISV latching mechanism position when the OSV latching profile is at a second OSV latching profile position.

The ISV latching mechanism can be attached to a slidable ISV element by using a solid connector that can include a bolt, a screw, a pin, etc. Alternatively, the ISV latching mechanism can be attached to a slidable ISV by being formed as part of a same body. At least a portion of the slidable ISV element can slide inside of a cylindrical housing having an attached hinge. The slidable ISV element can slide from a first slidable position to a second slidable position, wherein the slidable ISV element engages with (i.e. physically touches and can apply force onto) an ISV flapper attached to the hinge at the first slidable position and prevents the ISV flapper from moving from a first ISV flapper position to a second ISV flapper position. In some embodiments, when the slidable ISV element disengages from the ISV flapper (e.g. by moving to the second slidable position), the slidable ISV element allows the ISV flapper to move to the second ISV flapper position. In some embodiments, the slidable ISV element is at the first slidable position when the ISV latching mechanism is at the first ISV latching mechanism position, and the slidable ISV element is at a second slidable position when the OSV latching profile is at the second ISV latching mechanism position.

In some embodiments, a change in the pressure of the OSV control line or a signal sent to an OSV signal receiver (in the case of an electronic OSV) can close the ISV flapper via the slidable ISV element. For example, a pressure decrease in the OSV control line (if the control line is pressurizable) results in force being applied onto the ISV profile, to cause the ISV flapper to rotate around the hinge from the first ISV flapper position to the second ISV flapper position. In some embodiments, when the ISV flapper valve is in the second ISV flapper position, fluid is prevented from flowing through the cylindrical housing (and thus the ISV). Thus, the existing OSV control system can be used to control the ISV flapper position. No additional control system is needed.

In some embodiments, the combined assembly of the OSV and ISV may comprise a combined safety valve assembly. Relative orientation between the components of the assembly (e.g. between the profile of the OSV and the mechanism of the ISV) can be established at the surface or guided by a lock mandrel attached to the ISV. After the combined assembly of the OSV and ISV is lowered downhole, the ISV can be positioned at the proper depth and azimuthal orientation to allow the OSV control system to control the ISV flappers. Accordingly, some embodiments use the OSV control system to operate the ISV flapper.

Use of the ISV in combination with the OSV can provide advantages for various systems that use an OSV, such as electric OSV that does not use hydraulic communications, a dual line OSV with complex communication systems, and a size-constrained OSV that may complicate the addition of additional OSVs. In addition, the ISV can operate with an existing OSV control line (e.g. a hydraulic line) and can be fitted to various safety valves having an OSV profile and lock tubular profile. In this way, the ISV can restore the failsafe functions of an OSV having a degraded/broken flapper without requiring removal of the OSV from a borehole.

Example Well System

FIG. 1 is a schematic diagram of a well system having an outer safety valve (OSV) and an insertable safety valve (ISV). The well 100 is illustrated with a tubing string 110, such as a production and/or injection string, that passes fluids between a subterranean zone of interest and the surface 101. The well 100 may be cased with a casing 112, and together with the tubing string 110, form an annulus 114 therebetween. A seal, such as a packer 116, may be used to seal off the annulus 114 at a subsurface location above the subterranean zone.

The OSV 118 is coupled with a control line 120 via a control line interface 164. The OSV 118 may comprise one or more safety valves such as a tubing-retrievable safety valve (TRSV). The control lines 120 may comprise hydraulic tubing and pass hydraulic fluids to the control line interface 164 from a surface control system 122 on the surface 101 via a fitting 163. Alternatively, or in addition, the control line interface 164 may comprise a signal receiver 166 to receive at least one of an optical signal and an electromagnetic signal, and the control line 120 may comprise an electrically conductive material or an optically conductive material to carry the optical or electromagnetic signal. The OSV 118 may be configured with an actuation system 160. The actuation system 160 can be coupled to communicate with the surface control system 122 via control line 120. Alternatively, or in addition, the actuation system 160 can be coupled to communicate with the surface control system 122 via a wireless communication signal such as an electromagnetic signal or an acoustic signal, wherein the wireless communication signal is received by the signal receiver 166 in the OSV.

The OSV 118 can be configured to fail in a closed position in the absence of further activation (i.e. biased to default to a closed position). In a closed state, the OSV 118 seals against fluid flow through the tubing string 110. In some embodiments, control pressure from the surface control system 122 can open the OSV 118 and allow fluid to flow through the tubing string 110. If the OSV 118 loses control pressure (hydraulic) or a control signal (electromagnetic, optical, etc.) from the surface control system 122, the actuation system 160 no longer maintains the OSV 118 in an open state, and the OSV 118 defaults to a closed state. The OSV 118 can be configured to positively seal off hydraulic passages that may be coupled to a leaking or ruptured control line to prevent leakage of hydraulic fluid and/or other fluids from inside the OSV 118 into the annulus 114. In some embodiments, a change in the control pressure or control signal can result in a change in the axial position of the OSV profile 119, which can also induce the opening/closing of the ISV flapper 117.

The OSV profile 119 of the OSV 118 can be engaged with the ISV profile 152 of the ISV 150. In some embodiments, the control line 120 can be a hydraulic tubing. During a decrease in control pressure in the control line 120 (or an increase in pressure, in some embodiments) directed by the surface control system 122, the OSV profile 119 applies a corresponding force onto the ISV profile 152, such that the ISV profile 152 can then apply an upward force onto an ISV slidable opening prong 154 acting as an ISV slidable element. As explained further below, the resulting downward motion of the ISV slidable opening prong 154, acting as the ISV slidable element, can induce the ISV flapper 117 to close (e.g. to rotate counter-clockwise by 90 degrees about a vertical axis of the tubing string 110 in FIG. 1). Thus, changes in the control pressure (or control signal) sent through the control line 120 can cause a change in the position of the ISV flapper 117, stopping fluid flow through the ISV 150. In the following text, FIGS. 2-7 depict various components that may be similar to or identical to the OSV 118 and the ISV 150 of FIG. 1, adapted to operate in various configurations.

Example Apparatus

Figure 2:
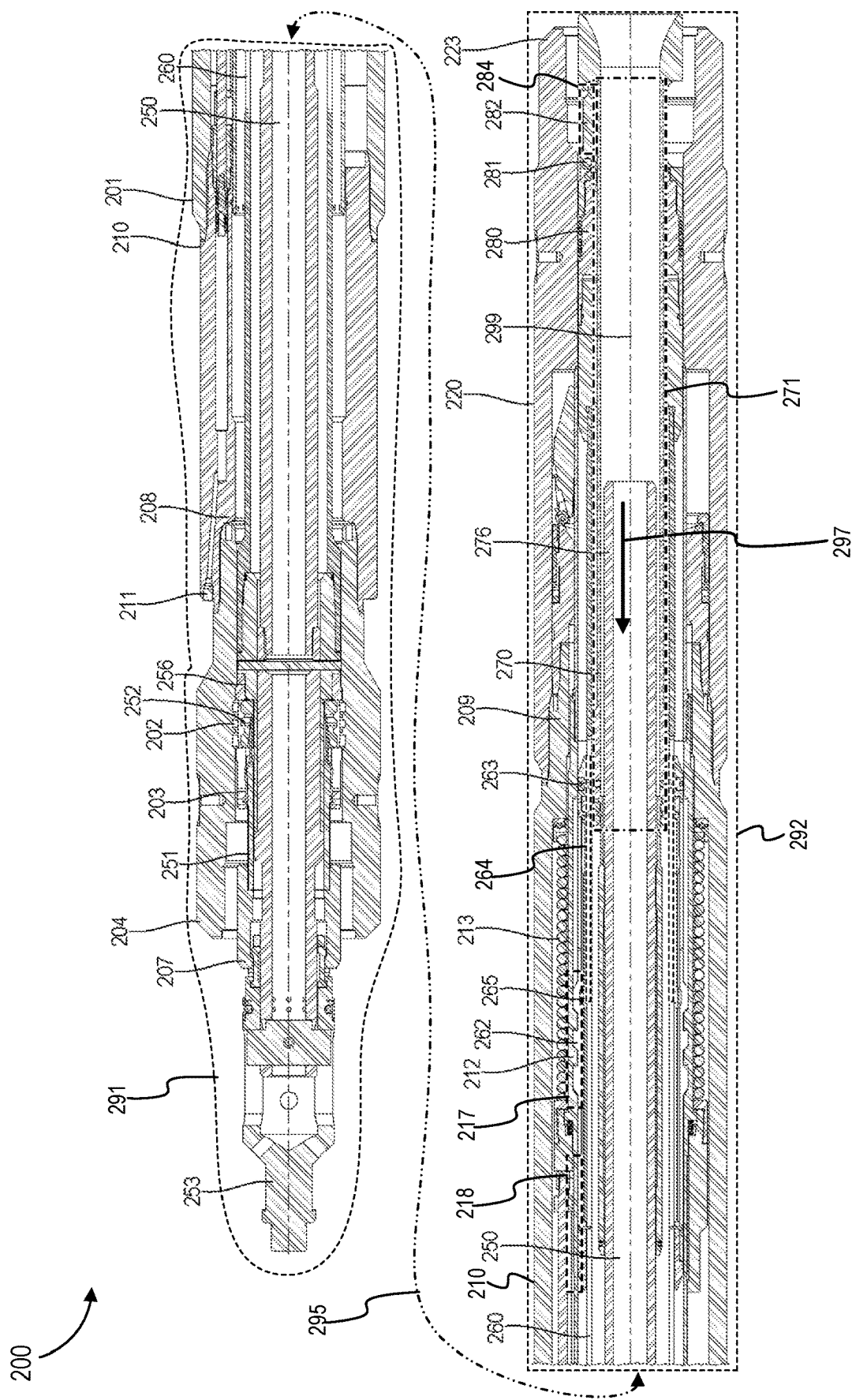
FIG. 2 is a cross-sectional view of a first example assembly showing an ISV inserted into an OSV before the ISV is anchored into the OSV.

FIG. 2 is a cross-sectional view of a first example assembly showing an ISV inserted into an OSV before the ISV is anchored into the OSV. For ease of illustration, the first example assembly 200 is shown divided into an upper portion 291 and a lower portion 292, wherein the right end of the upper portion 291 physically continues at the left end of the lower portion 292 as shown using the dashed/dotted double-ended arrows 295. The ISV 250, an OSV top sub 210, and an ISV housing 260 are numbered in both the upper portion 291 and the lower portion 292 to illustrate the physical continuity of the first example assembly 200.

The OSV 201 includes at least an OSV end sub 204, the OSV top sub 210 attached to the OSV end sub 204 at a first end 208 of the OSV top sub 210, and an OSV bottom sub 220 attached to the second end 209 of the OSV top sub 210. An inner wall 203 of the OSV end sub 204 includes an OSV lock mandrel profile 202. The OSV top sub 210 can be attached to the OSV end sub 204 and can include a control line connector 211 that is connected to a control line in a well system. For example, with reference to FIG. 1, the control line connector 211 can include a fitting 163, and the control line connector 211 can be connected to the control line 120. Pressurized fluid from the control line connector 211 can apply force onto the OSV spring 213, which is also inside of or otherwise attached to the OSV top sub 210. In some embodiments, the OSV spring 213 can provide a counter-force against (hydraulic) pressure from the control line connector 211. The OSV top sub 210 also includes an OSV latching profile 212 that is movably attached to the OSV spring 213 and is in a first OSV latching profile position 217, wherein the axial motion of the OSV spring 213 results in a proportional axial motion of the OSV latching profile 212. Further attached to the OSV top sub 210 is the OSV bottom sub 220 that be part of a second end 223 of the OSV 201. While not shown, the OSV bottom sub 220 can include one or more flappers that inhibit fluid flow from a wellbore annulus.

The ISV 250 can include or be attached to a lock mandrel 251. The ISV 250 can also include the ISV housing 260 attached to the lock mandrel 251 and an ISV slidable opening prong 270 attached to and disposed partially within the ISV housing 260, wherein the ISV housing 260 may comprise a cylindrical housing. A running prong 276 can be at least partially disposed within the inner volume of the lock mandrel 251 and the ISV housing 260. The running prong 276 can include the lock mandrel running tool 253 at a first end 207 of the ISV 250 that is attached to the lock mandrel 251 with a shear pin 254. The lock mandrel 251 can include an outer wall 256 that includes lock mandrel keys 252. While FIG. 2 shows a plurality of lock mandrel keys, some embodiments can include a single lock mandrel key in place of the lock mandrel keys 252. The lock mandrel keys 252 are complementary with the OSV lock mandrel profile 202, wherein the lock mandrel keys 252 are movable and can be pushed radially outward when the lock mandrel running tool 253 is axially pushed into the running prong 276.

The ISV housing 260 can be attached to the lock mandrel 251. An ISV latching mechanism 262 that is complementary to the OSV latching profile 212 is positioned at a first ISV latching mechanism position at or near the first OSV latching profile position 217 outside the radius of the ISV housing 260. The ISV latching mechanism 262 can be a separate solid structure that is movable in a direction parallel to the ISV housing axis 299 (e.g. leftward direction 297) with respect to the ISV housing 260. As further described below, the ISV latching mechanism 262 can be latched to the OSV latching profile 212. In addition, a locking sleeve 265 can be radially underneath the ISV latching mechanism 262 with respect to the ISV housing axis 299. As will be further described below for FIG. 4, the locking sleeve 265 can be used to secure the ISV latching mechanism 262 in an axial position. While the ISV latching mechanism 262 is shown as having three distinct protrusions from the radius, other ISV latching mechanisms can have any number of protrusions (e.g. one protrusion, two protrusion, five protrusions, etc.).

In some embodiments, the ISV latching mechanism 262 can be latched to the OSV latching profile 212 by cycling the OSV 201, wherein cycling the OSV 201 includes changing the axial position of the OSV latching profile 212 from a first OSV latching profile cycling position to a second OSV latching profile cycling position and back to the first OSV latching profile cycling position. In some embodiments, the first OSV latching profile cycling position can be the first OSV latching profile position 217 and the second OSV latching profile cycling position can be a second OSV latching profile position 218 as shown on FIG. 4. For example, cycling the OSV 201 can include pressurizing and de-pressurizing the fluid in the control line connector 211 to change the axial position of the OSV latching profile 212 from a first OSV latching profile position 217 to the second OSV latching profile position 218 and back to the first OSV latching profile position 217. In some embodiments, at least one of an electrical signal, optical signal, acoustic signal, and an electromagnetic signal can be received by a signal receiver in the OSV to cycle the OSV to change the axial position of the OSV latching profile 212 from the first OSV latching profile cycling position to a second OSV latching profile cycling position and back to the first OSV latching profile cycling position.

The ISV slidable opening prong 270 is at a first slidable position 271 and can be attached to the ISV latching mechanism 262 using a set of solid connectors 263, wherein each one of the set of solid connectors 263 fits through a guided passage of a set of guided passages 264 that allows the set of solid connectors 263 to change axial positions along the ISV housing 260. For example, the set of solid connectors 263 may comprise a set of bolts connecting the ISV slidable opening prong 270 to the ISV latching mechanism 262. While the ISV slidable opening prong 270 is shown as a slidable tubular in FIG. 2, alternative embodiments can include non-tubular shapes or non-hollow shapes that are still positioned to occupy or be disposed within some inner portion of the volume occupied by the non-tubular shape. For example, instead of comprising the ISV slidable opening prong 270, the ISV slidable element can comprise a slidable plank that slides relative to a non-sliding tubular that is at least partially inside of the ISV housing 260.

The ISV 250 can also include a flapper-holding component 280 attached to the ISV housing 260 and the lock mandrel keys 252. In some embodiments, the flapper-holding component 280 can also comprise a cylindrical housing. At least a portion of the ISV slidable opening prong 270 can be disposed closer to the center of the axis of the ISV housing 260 than the flapper-holding component 280. The flapper-holding component 280 is attached to an ISV flapper 282 in a first flapper position 284 at a flapper hinge 281. The flapper hinge 281 can include one or more elastic elements that can elastically rotate the ISV flapper 282 inward towards the ISV housing axis 299, wherein the ISV slidable opening prong 270 at the first slidable position 271 can engage the ISV flapper 282 to physically prevent the rotation of the ISV flapper 282. The ISV flapper 282 can have a surface area that covers the cross-sectional area of the ISV slidable opening prong 270, wherein the cross-sectional area is the area of the hollow portion of the ISV slidable opening prong 270 that is substantially perpendicular to the ISV housing axis 299. Alternatively, or in addition, the ISV flapper 282 can have a surface area that is greater than at least one of a cross-sectional area of the ISV housing 260, the flapper-holding component 280, and an additional tubular inside of the OSV 201.

Figure 3:
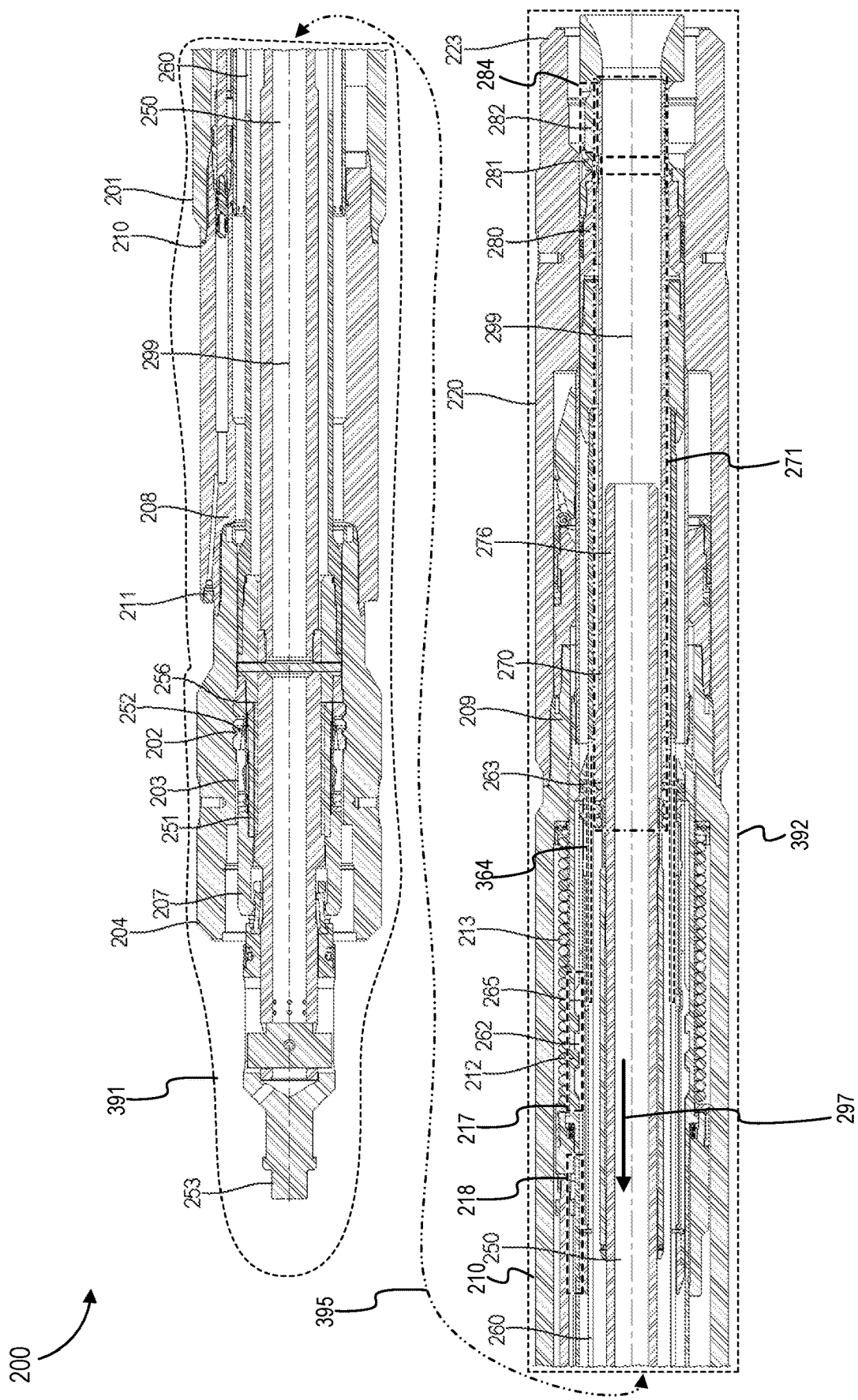
FIG. 3 is a cross-sectional view of the first example assembly while the ISV is being anchored into the OSV.

FIG. 3 is a cross-sectional view of the first example assembly while the ISV is being anchored into the OSV. For ease of illustration, the first example assembly 200 is shown divided into an upper portion 391 and a lower portion 392, wherein the right end of the upper portion 391 physically continues at the left end of the lower portion 392 as shown using the dashed/dotted double-ended arrows 395. The OSV top sub 210, the ISV 250 and the ISV housing 260 are numbered in both the upper portion 391 and the lower portion 392 to illustrate the physical continuity of the first example assembly 200. During the anchoring process, the lock mandrel running tool 253 is pushed into running prong 276 and the lock mandrel 251. The axial force from the lock mandrel running tool 253 pushes the lock mandrel keys 252 into the OSV lock mandrel profile 202 on the inner wall 203 of the OSV end sub 204 and anchoring the mechanism and the profile to each other.

During this anchoring process, other components of the OSV 201 and the ISV 250 can remain stationary or otherwise be independent of the motion of the lock mandrel running tool 253. In some embodiments, the force applied by the pressure from the control line connector 211 can remain constant and in balance with the force from the OSV spring 213. Furthermore, the set of solid connectors 263, components of the OSV bottom sub 220, the ISV slidable opening prong 270, and components attached to the flapper-holding component 280 (e.g. the ISV flapper 282 and the flapper hinge 281) can remain stationary during the anchoring process. For example, the OSV latching profile 212 can remain at the first OSV latching profile position 217, the ISV slidable opening prong 270 can remain at the first slidable position 271, and the ISV flapper 282 can remain at the first flapper position 284.

Figure 4:
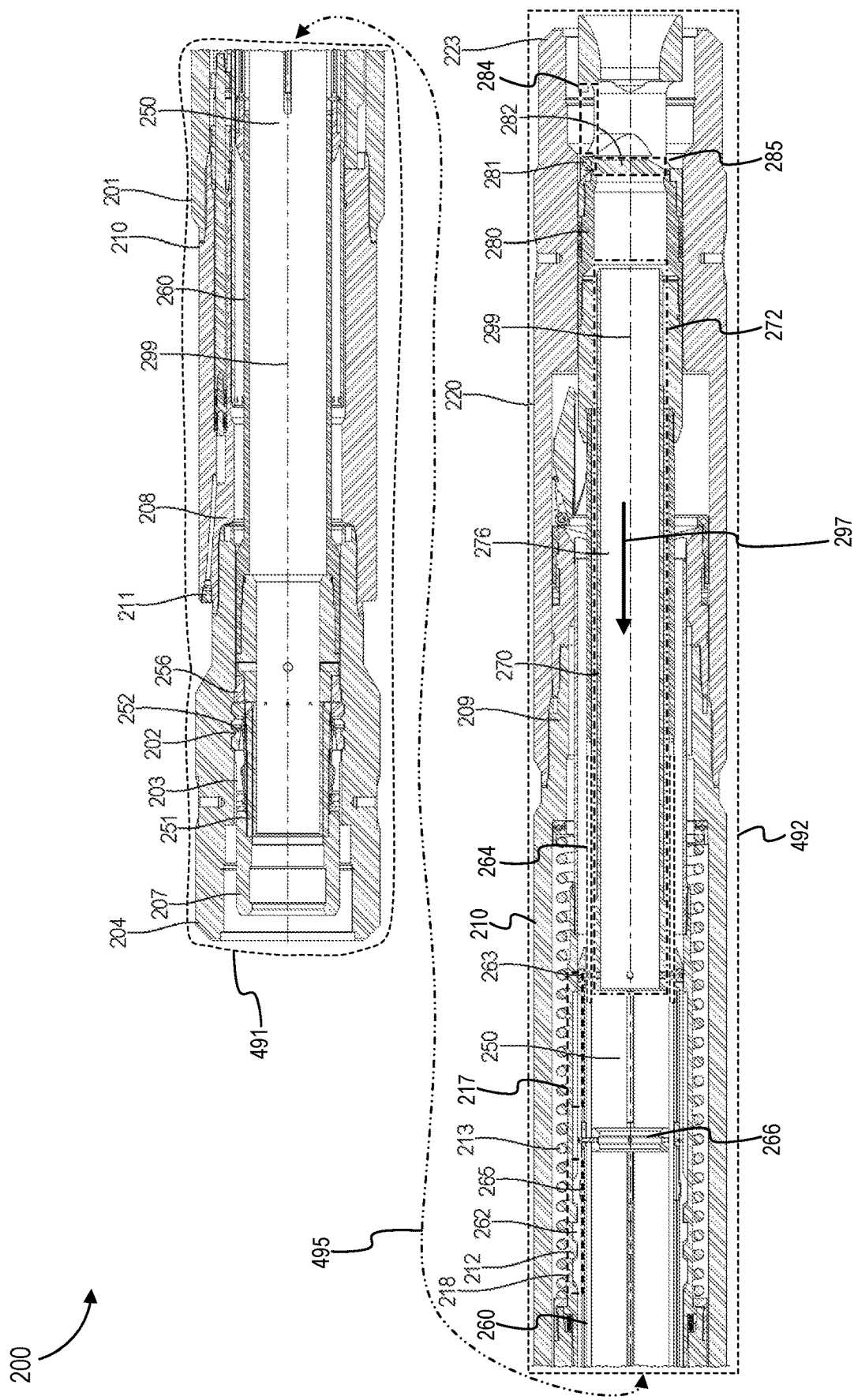
FIG. 4 is a cross-sectional view of the ISV anchored in the OSV after the ISV is in a failsafe state that substantially stops fluid flow through the first example assembly.

FIG. 4 is a cross-sectional view of the ISV anchored in the OSV after the ISV is in a failsafe state that substantially stops fluid flow through the first example assembly. For ease of illustration, the first example assembly 200 is shown divided into an upper portion 491 and a lower portion 492, wherein the right end of the upper portion 491 physically continues at the left end of the lower portion 492 as shown using the dashed/dotted double-ended arrows 495. The OSV top sub 210, the ISV 250 and the ISV housing 260 are numbered in both the upper portion 491 and the lower portion 492 to illustrate the physical continuity of the first example assembly 200. With reference to FIG. 3, the lock mandrel running tool 253 and the running prong 276 shown in FIG. 3 are detached from the lock mandrel 251 in FIG. 4. Though the lock mandrel running tool 253 is detached, the lock mandrel keys 252 of the lock mandrel 251 can remain anchored to the OSV lock mandrel profile 202 of the OSV end sub 204.

In addition, the pressure of the control line connector 211 can decrease, allowing the OSV spring 213 to push the OSV latching profile 212 of the OSV top sub 210 in the leftward direction 297 in the drawing (representing an uphole direction, toward the surface) from the first OSV latching profile position 217 to the second OSV latching profile position 218. The ISV latching mechanism 262 is latched to the OSV latching profile 212 and moves to a second ISV latching mechanism position, which is at or near the second OSV latching profile position 218. The second ISV latching mechanism position is leftward of the first ISV latching mechanism position, which is at or near the first OSV latching profile position 217. In some embodiments, the ISV latching mechanism 262 can remain attached to the OSV latching profile 212 due to at least the force from the elasticity of the ISV latching mechanism 262. For example, the ISV latching mechanism can include a steel protrusion, wherein the elastic strength of the steel protrusion allow it resist radial and/or axial forces that could otherwise push the steel protrusion out of the grooves of the OSV latching profile 212. In addition, a locking ring actuator 266 can be shifted to secure the locking sleeve 265 at a locking sleeve axial position. The locking sleeve 265 can then inhibit axial motion of the ISV latching mechanism 262, keeping the ISV latching mechanism 262 at or near the second OSV latching profile position 218.

In some embodiments, a pressure decrease in the control line connector 211 can be caused by at least one of an intended pressure change and the result of a detected failure in a well system containing the control line connector 211. For example, the failsafe state of the control line connector 211 decreases pressure and thus allows the OSV spring 213 to push the ISV latching mechanism 262 in the leftward direction 297 via the connection between the OSV latching profile 212 and the ISV latching mechanism 262. In some embodiments, the control line connector 211 can connect to an electrical or optical control line and receive a first type of control signal at a predetermined interval to keep the ISV latching mechanism 262 at a first ISV latching mechanism position. In such embodiments, a failsafe state that induces the OSV latching profile 212 to push the ISV latching mechanism 262 to a second ISV latching mechanism latching position can be initiated if a control signal is not received at the predetermined interval or if a second type of control signal is received instructing the failsafe state to start. In some embodiments, the failsafe state can be induced if an acoustic signal or electromagnetic signal is not received at a predetermined interval.

The force applied on the ISV latching mechanism 262 can be transferred to the ISV slidable opening prong 270 via the set of solid connectors 263. The ISV slidable opening prong 270 can slidably move in the direction of the spring-applied force (in the leftward direction 297 in the drawing) to a second slidable position 272, disengaging the ISV slidable opening prong 270 from the ISV flapper 282 and allowing the ISV flapper 282 to rotate from the first flapper position 284 to a second flapper position 285. Once free from the ISV slidable opening prong 270, one or more springs in the flapper hinge 281 attached to the flapper-holding component 280 can push the ISV flapper 282 radially inward toward the ISV housing axis 299, stopping fluid flow through the ISV 250 (and thus, stopping fluid flow through the OSV 201). In some embodiments, with reference to FIG. 2, if the attached ISV slidable opening prong 270 returns to its first slidable position 271 (e.g. in response to a fluid pressure change in the control line connector 211), the ISV flapper 282 can be pushed back to the first flapper position 284, opening the ISV 250 to fluid flow in a direction parallel to the ISV housing axis 299.

Figure 5:
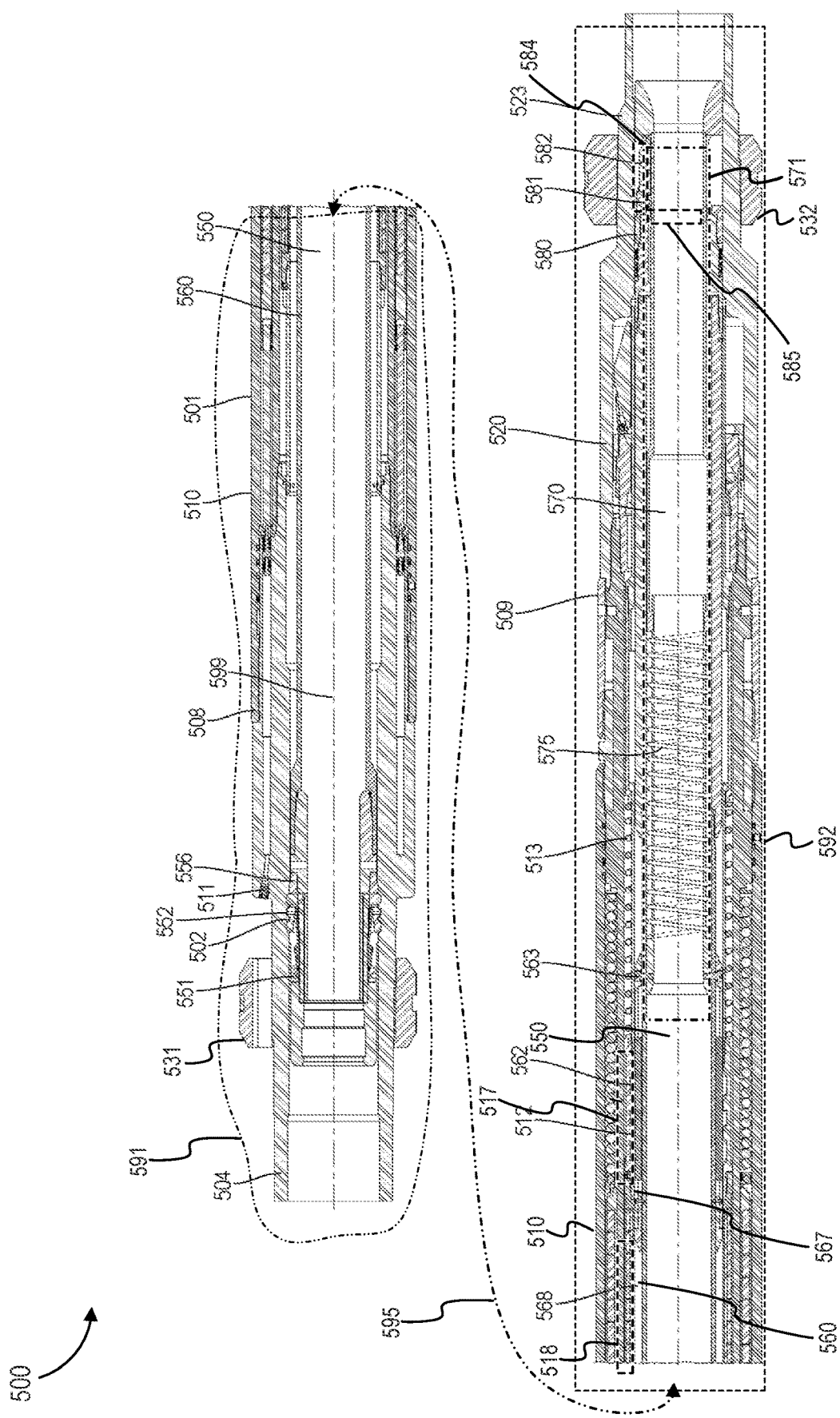
FIG. 5 is a cross-sectional view of an second example assembly that includes a second example ISV in a second example OSV.

FIG. 5 is a cross-sectional view of an second example assembly that includes a second example ISV in a second example OSV. For ease of illustration, the second example assembly 500 is shown divided into an upper portion 591 and a lower portion 592, wherein the right end of the upper portion 591 physically continues at the left end of the lower portion 592 as shown using the dashed/dotted double-ended arrows 595. An OSV tubing body 510, the second example ISV 550 and the ISV housing 560 are numbered in both the upper portion 591 and the lower portion 592 to illustrate the physical continuity of the second example assembly 500. The second example OSV 501 includes at least an OSV top sub 504, an OSV tubing body 510 attached to the OSV top sub 504 at a first end 508 of the OSV tubing body 510, and an OSV bottom sub 520 attached to the second end 509 of the OSV tubing body 510. An inner wall 503 of the OSV top sub 504 includes an OSV lock mandrel profile 502. Furthermore, in contrast to the OSV end sub 204 of FIG. 2, a first circumferential ring 531 wraps around the OSV top sub 504 to protect against shocks and improve borehole fitting.

An OSV tubing body 510 can be attached to the OSV top sub 504, wherein the OSV top sub 504 includes a control line connector 511 that is connected to a control line in a well system. For example, with reference to FIG. 1, the control line connector 511 can be connected to the control line 120. Pressurized fluid from the control line connector 511 can apply force onto an OSV spring 513, which is also inside of or otherwise attached to the OSV tubing body 510. In some embodiments, the OSV spring 513 can provide a counter-force against pressure from the control line connector 511. The OSV tubing body 510 also includes an OSV latching profile 512 that is movably attached to the OSV spring 513, wherein the axial motion of the OSV spring 513 results in a proportional axial motion of the OSV latching profile 512. Further attached to the OSV tubing body 510 is the OSV bottom sub 520 that be part of a second end 523 of the second example OSV 501. While not shown, the OSV bottom sub 520 can include one or more flappers that inhibit fluid flow from a wellbore annulus. Also, in contrast to the OSV bottom sub 220 of FIG. 2, a second circumferential ring 532 wraps around the OSV bottom sub 520 to protect against shocks and improve borehole fitting.

A lock mandrel 551 is attached to the second example ISV 550. The second example ISV 550 can include an ISV housing 560 attached to the lock mandrel 551, an ISV slidable opening prong 570 shown as a slidable tubular attached to and disposed partially within the ISV housing 560, and a flapper-holding component 580 attached to the ISV housing 560. The lock mandrel 551 can include an outer wall 556 that includes lock mandrel keys 552. The lock mandrel keys 552 are complementary with the OSV lock mandrel profile 502, wherein the lock mandrel keys 552 are anchored to the OSV lock mandrel profile 502 on the inner wall 503 of the OSV top sub 504.

The ISV housing 560 can be attached to the lock mandrel 551. An ISV latching mechanism 562 that is latched to the OSV latching profile 512 is positioned outside the radius of the ISV housing 560 at an outer wall 568. In some embodiments, the OSV spring 513 can push the OSV latching profile 512 from a first OSV latching profile position to a second OSV latching profile position, which also pushes the ISV latching mechanism 562 from the first ISV latching mechanism position 517 to the second ISV latching mechanism position 518. The ISV latching mechanism 562 can be a separate solid structure that is movable in an axial direction with respect to the ISV housing 560.

In some embodiments, the ISV latching mechanism 562 can be latched to the OSV latching profile 512 as a latching locking set. A latching locking set may include at least one radially compressible profile or mechanism that compresses to allow axial motion when the latching locking set are not latched together. For example, the ISV latching mechanism 562 can be a radially compressible mechanism that can be latched to the OSV latching profile 512 by cycling the second example OSV 501. The cycling can allow the OSV latching profile 512 to axially move across the ISV latching mechanism 562 until the ISV latching mechanism 562 latches into the OSV latching profile 512, wherein the latching action also locks the mechanism and the profile together by allowing the ISV latching mechanism 562 to be radially compressible and be trapped in the OSV latching profile 512. In addition, the support structure 567 can be at least one of a rigid element or an elastic element. For example, the support structure 567 can be a rigid element such as a ceramic block or a steel block that prevents radially inward motion of the at least one latching mechanism. Alternatively, the support structure 567 can be an elastic element such as a rubber block or a metal spring that props the at least one latching mechanism in a radially outward direction.

The ISV slidable opening prong 570, acting as a slidable element in the second example ISV 550, can be attached to the ISV latching mechanism 562 using a set of solid connectors 563, wherein each of the set of solid connectors 563 fit within a guided passage of a set of guided passages 564 that allows the set of solid connectors 563 to slide or otherwise change axial positions along the ISV housing 560. The ISV slidable opening prong 570 can be at a first slidable position 571 and engaged with an ISV flapper 582 to prevent the ISV flapper 582 from rotating. In addition, the ISV slidable opening prong 570 can include an attached spring-loaded nose 575, which can pull at least a portion of the ISV slidable opening prong 570 leftward as the ISV slidable opening prong 570 moves.

The second example ISV 550 can also include the flapper-holding component 580, wherein the flapper-holding component 580 can include a cylindrical housing. At least a portion of the ISV slidable opening prong 570 can be disposed closer to the center of the axis of the ISV housing 560 than the flapper-holding component 580. The flapper-holding component 580 is attached to the ISV flapper 582 at the flapper hinge 581. The flapper hinge 581 can include one or more springs that can apply a rotating force to rotate the ISV flapper 582 around the hinge from the first flapper position 584 to a second flapper position 585. The ISV flapper 582 can have a surface cross-sectional surface that covers the cross-sectional surface of fluid flow normal to the ISV housing axis 599.

Figure 6:
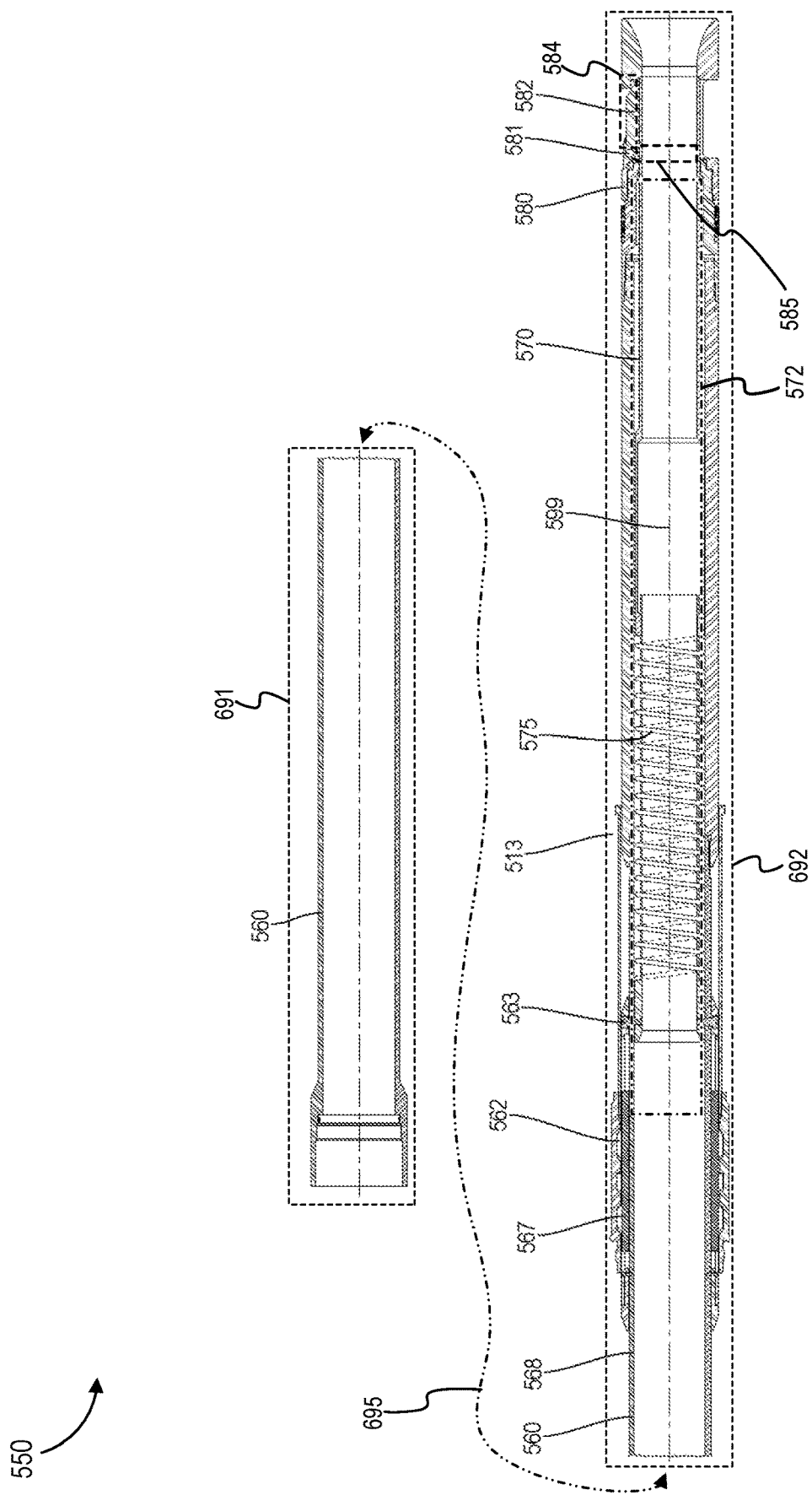
FIG. 6 is a cross-sectional view of the second example ISV.

FIG. 6 is a cross-sectional view of the second example ISV. For ease of illustration, the second example ISV 550 is shown divided into an upper portion 691 and a lower portion 692, wherein the right end of the upper portion 691 physically continues at the left end of the lower portion 692 as shown using the dashed/dotted double-ended arrows 695. The ISV housing 260 is numbered in both the upper portion 691 and the lower portion 692 to illustrate the physical continuity of the second example ISV 550. The second example ISV 550 includes the ISV housing 560, the ISV slidable opening prong 570 and the flapper-holding component 580. The ISV latching mechanism 562 is outside the outer wall 568 of the ISV housing 560 and can be attached to the ISV housing 560. The support structure 567 can prop the ISV latching mechanism 562 against radially compressive forces. The ISV latching mechanism 562 can be attached to the ISV slidable opening prong 570, which is shown to be a tubular element in FIG. 5. In some embodiments, the ISV slidable opening prong 570 may comprise other shapes, such as a circumferential set of elongated cylindrical rods or rectangular prisms.

The ISV latching mechanism 562 can slide with respect to the ISV housing 560. The ISV slidable opening prong 570 can be disposed inside of the ISV housing 560. A set of solid connectors 563, wherein each one of the set of solid connectors 563 fits through a guided passage from a set of guided passages 564 that allows the set of solid connectors 563 to change axial positions along the ISV housing 560. The set of solid connectors 563 can attach the ISV latching mechanism 562 to the ISV slidable opening prong 570, wherein the set of guided passages comprise a hole that allows axial motion of the set of solid connectors 563. Axial force on the ISV latching mechanism 562 can move the ISV slidable opening prong 570 in the same direction as the axial force, wherein additional axial and radial force can be provided by the spring-loaded nose 575.

The flapper-holding component 580 may be disposed radially outside the ISV slidable opening prong 570 and attached to the ISV housing 560 at an axial position shared with the ISV slidable opening prong 570. As explained above, the ISV slidable opening prong 570 can be axially translated and slide with respect to the position of the flapper-holding component 580. With reference to FIG. 5, when the ISV slidable opening prong 570 is at the first slidable position 571, the ISV slidable opening prong 570 can keep the ISV flapper 582 at the first flapper position 584 and prevent the ISV flapper 582 from rotating to the second flapper position 585. In some embodiments, when the ISV slidable opening prong 570 is moved to a second slidable position 572, the ISV flapper 582 is allowed to rotate to the second flapper position 585.

Figure 7:
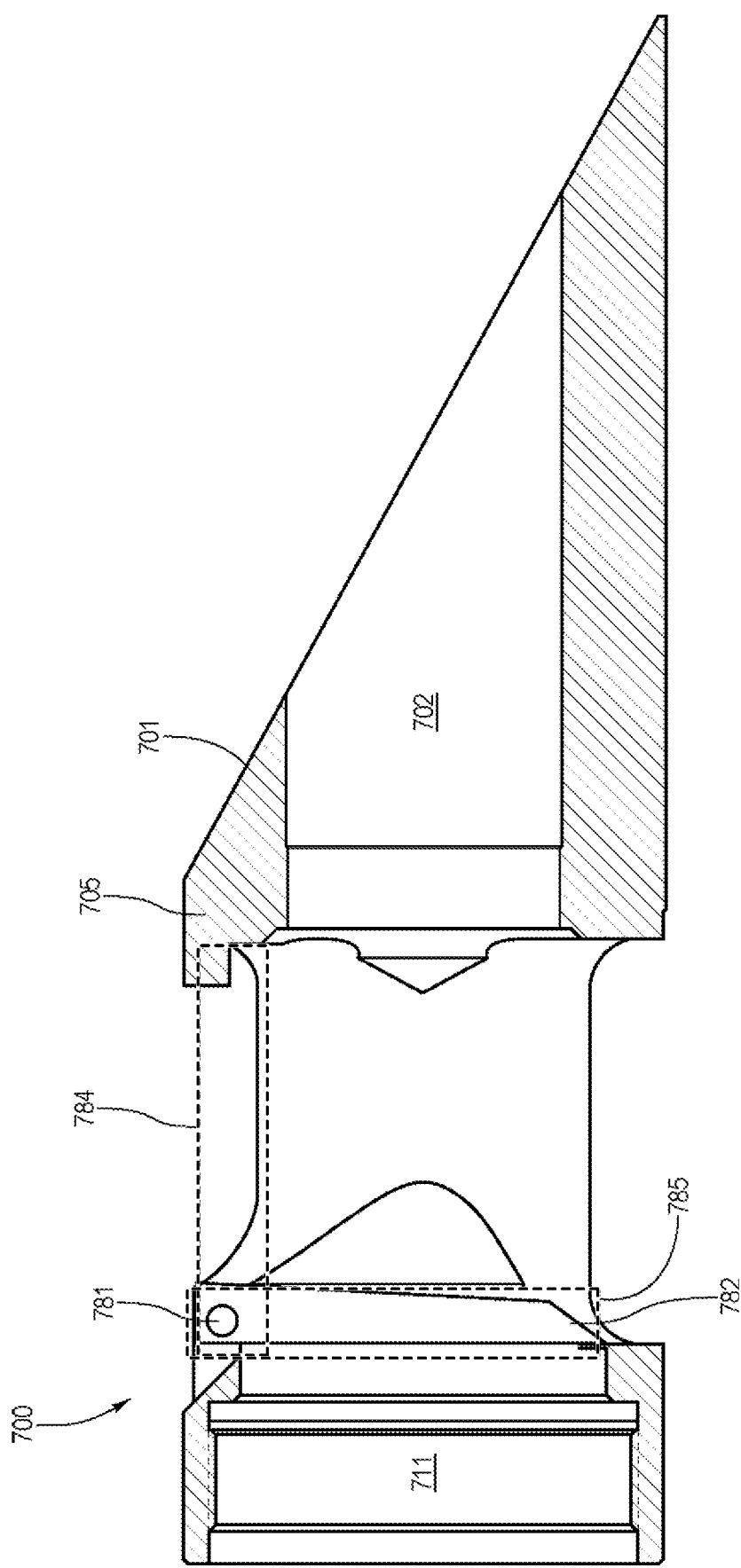
FIG. 7 is a cross-sectional view of an insertion nose.

FIG. 7 is a cross-sectional view of an insertion nose. With reference to FIGS. 5 and 6, the flapper-holding component 580 can include the insertion nose 700. A beveled end 701 formed by the component wall 705 is attached to the insertion nose 700, wherein the incline of the angled surface at the beveled end 701 can reduce the force required to push/stab through the insertion nose 700 through obstructions such as a damaged flapper or debris. For example, damage to an OSV can knock an OSV flapper loose in the internal volume of the OSV, and the tapered lead of the beveled end 701 can shove the loose OSV flapper to a side, reducing the force required to move the insertion nose 700 (and the ISV it is attached to) through the OSV.

In some embodiments, fluids can flow through a first volume 702 at the right end of the insertion nose 700 at the beveled end 701. The insertion nose 700 can include a flapper hinge 781 attached to the component wall 705 to the left of the beveled end 701, wherein, with further reference to FIGS. 2 and 6 above, the flapper hinge 781 can be similar to or identical to the flapper hinges 281 or 581. As shown in FIG. 7, the volume of the insertion nose 700 to the left of the flapper hinge 781 can be labeled as a second volume 711. A flapper 782 can be attached to the flapper hinge 781 and can be moved from a first flapper position 784 corresponding with an open flow state to a second flapper position 785 corresponding with a closed flow state. In some embodiments, when the flapper is in a closed flow state, the flapper isolates fluids in the first volume 702 from the second volume 711 and prevents fluid flow between the two volumes.

Example Flowchart

Figure 8:
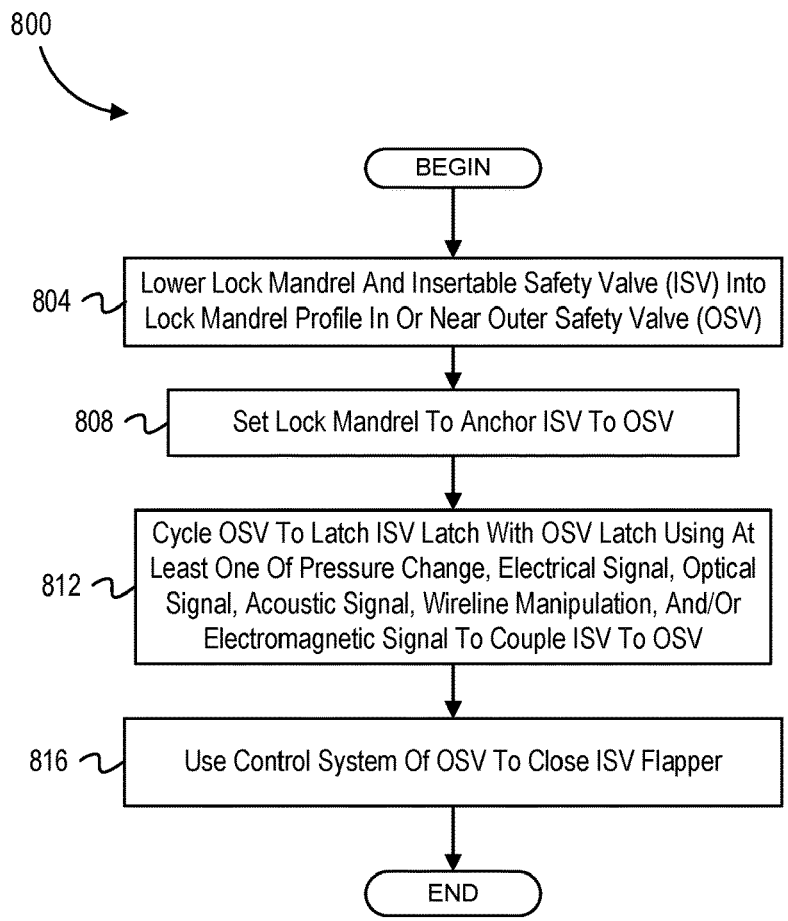
FIG. 8 depicts a flowchart of operations to anchor an ISV in an OSV and activate at least one ISV flapper.

FIG. 8 depicts a flowchart of operations to anchor an ISV in an OSV and activate at least one ISV flapper. With reference to FIG. 1, a processor may execute the operations in the flowchart 800 to cause a system to anchor the ISV 150 to the OSV 118 and close at least one ISV flapper in the ISV 150. Operations of the flowchart 800 begin at block 804.

At block 804, a lock mandrel and an ISV is lowered into a lock mandrel profile in or near an OSV. An ISV can align with an OSV when a set of ISV latching mechanisms of the ISV align with a corresponding set of OSV latching profiles of the OSV. The ISV can be guided to align with the OSV using a profile/key of the lock mandrel to align with a corresponding key/profile of an OSV lock mandrel, wherein the lock mandrel is attached to the ISV. The ISV can be detected to have aligned with the OSV based on a depth measurement of the ISV substantially matching a depth measurement of the OSV (e.g., depth matching within +/−2% or +/−1%). Alternatively, or in an addition, one or more sensors on at least one of the ISV and OSV can transmit a signal indicating that the ISV has been aligned with the OSV. The surface control system 122 shown in FIG. 1 may comprise such sensors.

At block 808, a lock mandrel is set to anchor the ISV into the OSV. Setting the lock mandrel to anchor the ISV to the OSV can include physically fixing a portion of the ISV to the OSV such that at least a portion of the ISV can resist axial motion with respect to the OSV. As described above, during an anchoring operation, lock mandrel keys attached to the lock mandrel can be secured to an OSV key profile attached to the OSV, wherein the lock mandrel is attached to the ISV. For example, with respect to FIG. 2, the lock mandrel keys 252 can be pushed upwards to anchor into the OSV lock mandrel profile 202. Alternatively, instead of using profiles/keys for anchoring, an ISV or a lock mandrel attached to the ISV can include one or more hooks to hook into a set of holes in the OSV, a set of electromagnets to magnetically fix the ISV to the OSV, etc.

At block 812 in FIG. 8, the OSV is cycled to latch the ISV to the OSV using at least one of a pressure change, an electrical signal, an optical signal, an acoustic signal, wireline manipulation and an electromagnetic signal to couple the ISV to the OSV. Cycling the OSV includes activating at least one mechanism of the OSV that induces axial motion in an OSV latching profile to move from a first OSV latching profile cycling position to a second OSV latching profile cycling position. In some embodiments, cycling the OSV can also include moving from the second OSV latching profile cycling position to the first OSV latching profile cycling position. For example, with respect to FIG. 2, cycling includes pressurizing and de-pressurizing the fluid in the control line connector 211 to change the axial position of the OSV latching profile 212 from a first OSV profile position to a second OSV profile position and back to the initial OSV profile position. Alternatively, or in addition, the OSV can be electrically controlled by an electrical or optical control line, and cycling can include transmitting an electrical signal or optical signal to a signal receiver in communication with an actuation system that can axially translate the OSV latching profile in the OSV. Alternatively, or in addition, the OSV can be wirelessly controlled, wherein cycling can include transmitting an electromagnetic signal or sonic signal to a signal receiver in communication with an actuation system that can axially translate an OSV latching profile in the OSV. As the OSV latching profile moves, it can encounter an ISV latching mechanism and latch with the ISV latching profile. For example, with respect to FIG. 2, cycling can latch the OSV latching profile 212 to the ISV latching mechanism 262.

At block 816, the control system attached to the OSV is used to close an ISV flapper of the ISV. The control system of the OSV can include and be controlled by a control line. The control line of the OSV can be a physical control line such as a hydraulic pipe, electrical connector, optical fiber, etc. Alternatively, the control system can be controlled by a wireless system and receive command signals via electromagnetic signals or sonic signals.

The OSV control system can control the axial motion of an OSV latching profile to move from a first OSV latching profile position to a second OSV latching profile position. This can cause the ISV latching mechanism to move from a first ISV latching mechanism position to a second ISV latching mechanism position after the latching operation described at block 808 is complete. In some embodiments, the ISV slidable opening prong can be at a first slidable position when the ISV latching mechanism is at the first ISV latching mechanism position, and the ISV slidable opening prong can be at a second slidable position when the ISV latching mechanism is at the second ISV latching mechanism position. In some embodiments, an ISV slider at the first slider position can prevent an ISV flapper from moving from a first flapper position to a second flapper position. Moving the ISV slidable opening prong from the first slider position to second slider position can free the ISV flapper to rotate to the second flapper position. In some embodiments, an ISV flapper in the second flapper position can covering an interior volume of the ISV and prevent fluid flow through the ISV. In some embodiments, the OSV control system can require constant pressure or regular signal input to keep the ISV flapper open, and thus a failure to provide the constant pressure or to transmit the regular signal can cause the ISV flapper to default to a closed state. For example, the failure can be detected as pipe damage causing a pressure leak in the control line and/or an electrical power failure, and the detected failure can cause the ISV flapper to default to the closed state.

Example Computer

Figure 9:
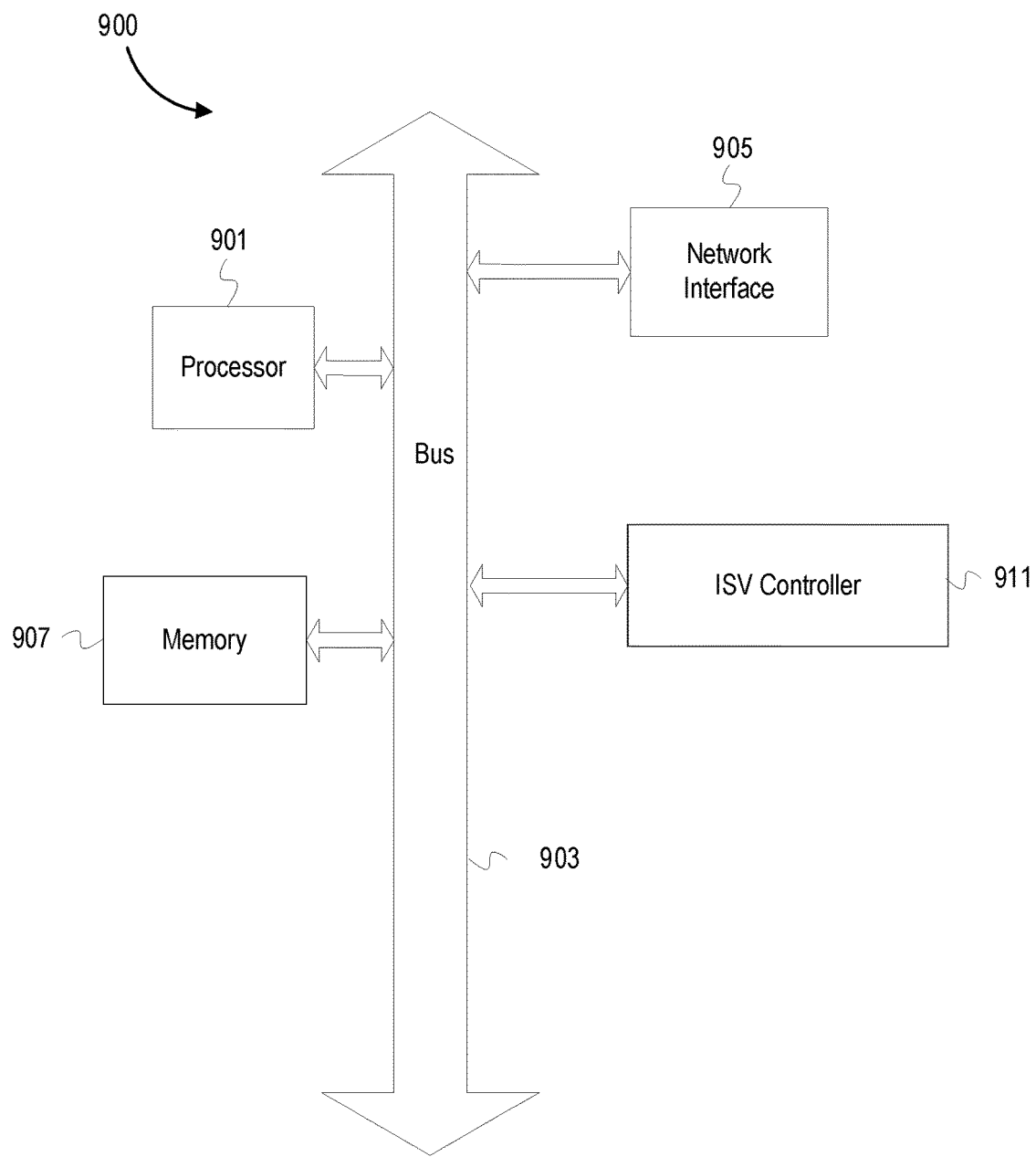
FIG. 9 depicts an example computer device for an electrically operated OSV.

FIG. 9 depicts an example computer device for an electrically operated OSV. A computer device 900 includes a processor 901 (possibly including multiple processors, multiple cores, multiple nodes, and/or implementing multithreading, etc.). The computer device 900 includes a memory 907. The memory 907 can include system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 900 also includes a bus 903 (e.g., PCI, ISA, PCI-Express, HyperTransport® bus, InfiniBand® bus, NuBus, etc.) and a network interface 905 (e.g., a Fiber Channel interface, an Ethernet interface, an internet small computer system interface, SONET interface, wireless interface, etc.). The computer device 900 includes an insertable safety valve controller 911. The insertable safety valve controller 911 can perform one or more operations described above. For example, the insertable safety valve controller 911 may operate to cause a system to lower an ISV into an OSV until the ISV aligns with the OSV. Additionally, the insertable safety valve controller 911 can cycle an OSV to latch the ISV to the OSV and close an ISV flapper of the ISV using a control system of the OSV.

Any one of the previously described functionalities can be partially (or entirely) implemented in hardware and/or on the processor 901. For example, the functionality can be implemented with an application specific integrated circuit, in logic implemented in the processor 901, in a co-processor on a peripheral device or card, etc. Further, realizations can include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 can be coupled to the processor 901. The computer device 900 can be located at the surface and/or integrated into component(s) in the borehole. For example, with reference to FIG. 9, the computer system 1098 may comprise one or more of the computer devices 900.

By implementing various embodiments, as described herein, an ISV can be latched onto an OSV and operated using the corresponding OSV control system. By using the OSV control system to operate the ISV (and more specifically a flapper in the ISV), the OSV can be used to stop fluid flow in a well system even if a flapper in the OSV is damaged. This can restore safety valve functionality to a system with a damaged OSV flapper without removing an OSV or adding an additional valve control system to the well system.

As will be appreciated, aspects of the disclosure can be embodied as a system, method or program code/instructions stored in one or more machine-readable media. Aspects can take the form of hardware, software (including firmware, resident software, micro-code, etc.), or a combination of software and hardware aspects that can all generally be referred to herein as a "circuit" or "system." The functionality presented as individual units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

Variations and Terminology

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Use of the phrase "a set of" followed by an element should not be treated as exclusive to a plurality of elements, unless specifically stated otherwise. A clause that recites "a set of items" can be referring to one item or a plurality of items. As used in this application, two components (e.g. a latching mechanism and a latching profile) can be anchored to each other when they are engaged in both an axial direction and a radial direction.

EXAMPLE EMBODIMENTS

Example embodiments include the following:

Embodiment 1

An apparatus comprising: a cylindrical housing having a hinge; a flapper attached to the hinge, wherein the flapper can rotate around the hinge from a first flapper position to a second flapper position; a slidable element within the cylindrical housing, wherein the slidable element is slidable from a first slidable position to a second slidable position, and wherein the slidable element engages with the flapper at the first slidable position and prevents the flapper from moving to the second flapper position, and wherein the slidable element allows the flapper to move to the second flapper position from the first flapper position when the slidable element is disengaged from the flapper; and at least one latching mechanism attached to the slidable element, wherein the at least one latching mechanism is movable from a first latching mechanism position to a second latching mechanism position, and wherein the slidable element is at the first slidable position when the at least one latching mechanism is at the first latching mechanism position, and wherein the slidable element is at the second slidable position when the at least one latching mechanism is at the second latching mechanism position.

Embodiment 2

The apparatus of Embodiment 1, wherein the flapper prevents fluid flow through the apparatus when the flapper is in the second flapper position.

Embodiment 3

The apparatus of Embodiments 1 or 2, wherein the at least one latching mechanism is attached to a support structure, wherein the support structure is a rigid element that prevents radially inward motion of the at least one latching mechanism.

Embodiment 4

The apparatus of any of Embodiments 1-3, wherein the slidable element is a slidable tubular, and wherein a surface area of the flapper is greater than a cross-sectional area of the slidable tubular.

Embodiment 5

The apparatus of any of Embodiments 1-4, further comprising a support structure, wherein the support structure is an elastic element that props the at least one latching mechanism in a radially outward direction.

Embodiment 6

The apparatus of any of Embodiments 1-5, further comprising a beveled end attached to the cylindrical housing.

Embodiment 7

The apparatus of any of Embodiments 1-6, further comprising at least one locking profile attached to the cylindrical housing, wherein the locking profile is at a first locking position when the slidable element is at the first slidable position and when the slidable element is at the second slidable position.

Embodiment 8

The apparatus of any of Embodiments 1-7, further comprising a second cylindrical housing, wherein the at least one latching mechanism is outside the surface of the second cylindrical housing.

Embodiment 9

The apparatus of any of Embodiments 1-8, further comprising a solid connector that attaches the slidable element to the at least one latching mechanism, wherein at least a portion of the solid connector is inside of a guided passage of the second cylindrical housing, and wherein at least a portion of the slidable element is inside an inner volume of the second cylindrical housing.

Embodiment 10

A system comprising: an outer safety valve (OSV) positioned downhole, wherein the OSV comprises at least one OSV latching profile on an inner wall of the OSV; and an insertable safety valve (ISV) positioned inside of the OSV, wherein the ISV comprises, a cylindrical housing having a hinge, a flapper attached to the hinge, wherein the flapper can rotate around the hinge from a first flapper position to a second flapper position, a slidable element within the cylindrical housing, wherein the slidable element is slidable from a first slidable position to a second slidable position, and wherein the slidable element engages with the flapper at the first slidable position and prevents the flapper from moving to the second flapper position, and wherein the slidable element allows the flapper to move to the second flapper position from the first flapper position when the slidable element is disengaged from the flapper, and at least one ISV latching mechanism attached to the slidable element, wherein the at least one ISV latching mechanism is movable from a first latching profile position to a second latching profile position, and wherein the slidable element is at the first slidable position when the at least one ISV latching mechanism is at the first latching profile position, and wherein the slidable element is at the second slidable position when the at least one ISV latching mechanism is at the second latching profile position, and wherein the at least one ISV latching mechanism is latched with the at least one OSV latching profile.

Embodiment 11

The system of Embodiment 10, wherein the OSV includes a hollow control line connector to connect to a control line.

Embodiment 12

The system of Embodiments 10 or 11, wherein the OSV includes an electronic control line connector to connect to a control line, wherein the control line transmits at least one of an electrical signal and an optical signal.

Embodiment 13

The system of any of Embodiments 10-12, wherein the OSV includes a signal receiver to receive at least one of an electromagnetic signal and an acoustic signal.

Embodiment 14

The system of any of Embodiments 10-13, wherein the OSV comprises at least one OSV anchoring profile, and wherein the ISV is attached to a lock mandrel having a lock mandrel key, and wherein the at least one OSV anchoring profile is anchored with the lock mandrel key.

Embodiment 15

The system of any of Embodiments 10-14, wherein the at least one OSV latching profile and the at least one ISV latching mechanism form a latching locking set, wherein at least one component of the at least one OSV latching profile or the at least one ISV latching mechanism is radially compressible.

Embodiment 16

A method comprising: lowering an insertable safety valve (ISV) into an outer safety valve (OSV) having at least one OSV latching profile on an inner wall of the OSV, wherein the ISV comprises a cylindrical housing having a hinge, a flapper attached to the hinge, wherein the flapper can rotate around the hinge from a first flapper position to a second flapper position, a slidable element within the cylindrical housing, wherein the slidable element is slidable from a first slidable position to a second slidable position, and wherein the slidable element engages with the flapper at the first slidable position and prevents the flapper from moving to the second flapper position, and wherein the slidable element allows the flapper to move to the second flapper position from the first flapper position when the slidable element is disengaged from the flapper, and at least one ISV latching mechanism attached to the slidable element, wherein the at least one ISV latching mechanism is movable from a first latching profile position to a second latching profile position, and wherein the slidable element is at the first slidable position when the at least one ISV latching mechanism is at the first latching profile position, and wherein the slidable element is at the second slidable position when the at least one ISV latching mechanism is at the second latching profile position, and wherein the at least one ISV latching mechanism is latched with the at least one OSV latching profile; and cycling the OSV to latch the at least one OSV latching profile to at least one ISV latching profile, wherein cycling the OSV comprises moving the at least one OSV latching profile from a first OSV latching profile cycling position to a second OSV latching profile cycling position, wherein the moving of the at least one OSV latching profile latches the OSV latching profile to the at least one ISV latching profile.

Embodiment 17

The method of Embodiment 16, further comprising moving the at least one OSV latching profile from a first OSV latching profile position to a second OSV latching profile position, wherein the moving of the at least one OSV latching profile induces the flapper to move from the first flapper position to the second flapper position.

Embodiment 18

The method of Embodiments 16 or 17, further comprising anchoring an ISV anchoring profile attached to the ISV to an OSV lock mandrel profile attached to the OSV.

Embodiment 19

The method of any of Embodiments 16-18, wherein cycling the OSV comprises: changing a pressure in a control line connected to the OSV from a first pressure to a second pressure, wherein changing the pressure to the second pressure moves the OSV latching profile to the second OSV latching profile cycling position; and changing the pressure in the control line connected to the OSV from the second pressure to the first pressure, wherein changing the pressure to the first pressure moves the OSV latching profile to the first OSV latching profile cycling position.

Embodiment 20

The method of any of Embodiments 16-19, wherein cycling the OSV comprises transmitting at least one signal to a signal receiver of the OSV, wherein the at least one signal comprise at least one of an electrical signal, an optical signal, an electromagnetic signal, and an acoustic signal.

What is claimed is:

1. An insertable safety valve comprising:
a cylindrical housing having a hinge;
a flapper attached to the hinge, wherein the flapper can rotate around the hinge from a first flapper position to a second flapper position;
a slidable element within the cylindrical housing, wherein the slidable element is slidable from a first position to a second position, and wherein the slidable element engages with the flapper at the first position and prevents the flapper from moving to the second flapper position, and wherein in the second position the slidable element allows the flapper to move to the second flapper position from the first flapper position;
at least one locking profile attached to the cylindrical housing, wherein the locking profile is at a first locking position when the slidable element is at the first position and when the slidable element is at the second position; and
at least one latching mechanism attached to the slidable element, wherein the at least one latching mechanism is movable from a first latching mechanism position to a second latching mechanism position, and wherein the slidable element is at the first position when the at least one latching mechanism is at the first latching mechanism position, and wherein the slidable element is at the second position when the at least one latching mechanism is at the second latching mechanism position.

2. The insertable safety valve of claim 1, wherein the flapper prevents fluid flow through the insertable safety valve when the flapper is in the second flapper position.

3. The insertable safety valve of claim 1, wherein the at least one latching mechanism is attached to a support structure, wherein the support structure is a rigid element.

4. The insertable safety valve of claim 1, wherein the slidable element is a tubular, and wherein a surface of the flapper covers a cross-sectional area of the tubular when the flapper is in the second flapper position.

5. The insertable safety valve of claim 1, further comprising a support structure, wherein the support structure is an elastic element that props the at least one latching mechanism in a radially outward direction.

6. The insertable safety valve of claim 1, further comprising an insertion nose, wherein the insertion nose is beveled or angled.

7. The insertable safety valve of claim 1, further comprising a second cylindrical housing, wherein the at least one latching mechanism is external to surface of the second cylindrical housing.

8. The insertable safety valve of claim 7, further comprising a solid connector that attaches the slidable element to the at least one latching mechanism, wherein at least a portion of the solid connector is inside of a guided passage of the second cylindrical housing.

9. The insertable safety valve of claim 1, wherein an outer wall of the cylindrical housing is operable to allow fluid flow through the insertable safety valve when the flapper is in the first flapper position.

10. A system comprising:
an outer safety valve (OSV) positioned downhole, wherein the OSV comprises at least one OSV latching profile on an inner wall of the OSV; and
an insertable safety valve (ISV) positioned inside of the OSV, wherein the ISV comprises,
a cylindrical housing having a hinge,
a flapper attached to the hinge, wherein the flapper can rotate around the hinge from a first flapper position to a second flapper position,
a slidable element within the cylindrical housing, wherein the slidable element is slidable from a first position to a second position, and wherein the slidable element engages with the flapper at the first position and prevents the flapper from moving to the second flapper position, and wherein in the second position the slidable element allows the flapper to move to the second flapper position from the first flapper position, and
at least one ISV latching mechanism attached to the slidable element, wherein the at least one ISV latching mechanism is movable from a first latching profile position to a second latching profile position, and wherein the slidable element is at the first position when the at least one ISV latching mechanism is at the first latching profile position, and wherein the slidable element is at the second position when the at least one ISV latching mechanism is at the second latching profile position, and wherein the at least one ISV latching mechanism is latched with the at least one OSV latching profile.

11. The system of claim 10, wherein the OSV includes a hollow control line connector to connect to a control line.

12. The system of claim 10, wherein the OSV includes an electronic control line connector to connect to a control line, wherein the control line transmits at least one of an electrical signal and an optical signal.

13. The system of claim 10, wherein the OSV includes a signal receiver to receive at least one of an electromagnetic signal and an acoustic signal.

14. The system of claim 10, wherein the OSV comprises at least one OSV anchoring profile, and wherein the ISV is attached to a lock mandrel having a lock mandrel key, and wherein the at least one OSV anchoring profile is anchored with the lock mandrel key.

15. The system of claim 10, wherein the at least one OSV latching profile and the at least one ISV latching mechanism form a latching locking set, wherein at least one component of the at least one OSV latching profile or the at least one ISV latching mechanism is radially compressible.

16. A method comprising:
lowering an insertable safety valve (ISV) into an outer safety valve (OSV) having at least
one OSV latching profile on an inner wall of the OSV, wherein the ISV comprises
a cylindrical housing having a hinge,
a flapper attached to the hinge, wherein the flapper can rotate around the hinge from a first flapper position to a second flapper position,
a slidable element within the cylindrical housing, wherein the slidable element is slidable from a first position to a second position, and wherein the slidable element engages with the flapper at the first position and prevents the flapper from moving to the second flapper position, and wherein in the second position the slidable element allows the flapper to move to the second flapper position from the first flapper position, and
at least one ISV latching mechanism attached to the slidable element, wherein the at least one ISV latching mechanism is movable from a first latching profile position to a second latching profile position, and wherein the slidable element is at the first position when the at least one ISV latching mechanism is at the first latching profile position, and wherein the slidable element is at the second position when the at least one ISV latching mechanism is at the second latching profile position, and wherein the at least one ISV latching mechanism is latched with the at least one OSV latching profile; and connecting the at least one OSV latching profile to at least one ISV latching profile, wherein connecting the at least one OSV latching profile comprises moving the at least one OSV latching profile from a first OSV latching profile position to a second OSV latching profile position, and wherein the moving of the at least one OSV latching profile latches the OSV latching profile to the at least one ISV latching profile.

17. The method of claim 16, further comprising moving the at least one OSV latching profile from a first OSV latching profile position to a second OSV latching profile position, wherein the moving of the at least one OSV latching profile induces the flapper to move from the first flapper position to the second flapper position.

18. The method of claim 16, further comprising anchoring an ISV anchoring profile attached to the ISV to an OSV lock mandrel profile attached to the OSV.

19. The method of claim 16, wherein connecting the at least one OSV latching profile further comprises:
   changing a pressure in a control line connected to the OSV from a first pressure to a second pressure, wherein changing the pressure to the second pressure moves the OSV latching profile to the second OSV latching profile position; and
   changing the pressure in the control line connected to the OSV from the second pressure to the first pressure, wherein changing the pressure to the first pressure moves the OSV latching profile to the first OSV latching profile position.

20. The method of claim 16, wherein connecting the at least one OSV latching profile further comprises transmitting at least one signal to a signal receiver of the OSV, wherein the at least one signal comprises at least one of an electrical signal, an optical signal, an electromagnetic signal, and an acoustic signal.

\* \* \* \* \*